April 8, 1969  A. V. GROSSE  3,437,732
HIGH MELT ENGINE OF THE ROTARY TYPE
Filed March 31, 1966

INVENTOR.
ARISTID V. GROSSE
BY Arthur Robert
HIS ATTORNEY

United States Patent Office 3,437,732
Patented Apr. 8, 1969

3,437,732
HIGH MELT ENGINE OF THE ROTARY TYPE
Aristid V. Grosse, Philadelphia, Pa., assignor to Reynolds Metals Company, Richmond, Va., a corporation of Delaware
Filed Mar. 31, 1966, Ser. No. 539,017
Int. Cl. H05b 7/18
U.S. Cl. 13—9          6 Claims This invention relates to the arts of melting materials having extremely high melting points ranging up to 4200° K., which is the highest presently known melting point, of heating these molten materials to temperatures higher than their melting point temperatures and of containing them at such high temperatures for useful periods of time. For the sake of simplicity such materials are generally designated herein as "high melts" or "high melting materials" while the engines for heating them or containing them, or both, are generally designated as "high melt engines."

It is desirable to develop a high melt engine for liquefying or containing high melts (or both) under controlled operating conditions such that engine temperatures can be maintained at a selected value in a range extending from a low limit approximating 1500–2000° K. to a high limit as far above the low limit as is practical, say 5000–10,000° K. High melt engines are necessary for use in conducting experiments under controlled conditions to develop knowledge and data concerning the physical and chemical behavior of various high melt materials (and combinations thereof) under high temperatures of the order above given, these studies including disassocation and ionization, equilibrium conditions radiative properties, heat conduction through inter faces and the transfer of heat from a liquid surface into one or more gases particularly hydrogen.

High melt engines are desirable for use in rockets to establish and maintain very high rocket nozzle temperatures. With higher temperatures, higher gas nozzle exit velocities can be achieved. With significantly higher gas nozzle exit velocities, significantly better fuel consumption efficiencies are obtained. For example, with a rocket temperature high enough to produce the gas nozzle exit velocity of 32,200 feet per second, the size of the rocket required to send a given payload in earth orbit on the way to Mars approximates 28.5% of that required by the so-called high energy rocket using liquid oxygen and liquid hydrogen and having a gas nozzle exit velocity of 13,700.

My U.S. patent, No. 2,997,006, discloses a high melt engine of the rotary type wherein a liquid high melt is centrifuged into liquid pipe form. This particular engine is in the form of a centrifugal reactor wherein aluminum is liquefied by the exothermic reaction with oxygen and the resulting liquid in the reactor is rotated to centrifuge the molten aluminum into the form of a liquid pipe. However, the use of that engine is limited to high melt material which can be melted by an exothermic chemical reaction.

Other high melt engines of the rotary type heretofore proposed by me may be identified as: the plasma-jet rotary furnace wherein a noble gas heated to the range of 5000–10,000° K. was jetted axially into the cylindrical axial chamber of a rotary furnace where the gas heat liquefied an adjacent portion of the furnace liner and the rotation of the furnace centrifuged that liquid into liquid pipe form; and an ohmic rotary furnace designed to melt a furnace liner by electrical resistance heating in the liner itself and to centrifuge that liquid into liquid pipe form. See the May 17, 1963 issue of "Science," vol. 140, pages 781–789.

The principal object of the present invention is to provide still another form of rotary engine for melting high melts or for containing a molten high melt for a useful period of time or for both.

I have achieved this objective in a high melt engine of the rotary type having a cylindrical axial inner chamber by providing that inner chamber with a pair of spaced electrodes, one in the form of a rod-like electrode extending along the axis of the inner chamber and terminating adjacent the center thereof and the other in the form of an open-ended high melt cylinder surrounding the inner end of the rod-like electrode in outwardly spaced relation thereto. With this arrangement under operative rotation, a radially-extending electrical arc may be maintained between these electrodes under electrical power conditions sufficient to heat the cylindrical electrode up to or above its melting point to form a liquid pipe or to maintain that electrode in such a molten pipeforming condition (or both).

The invention is illustrated in the accompanying drawings wherein.

CONVENTIONAL STRUCTURE

Figure 1:
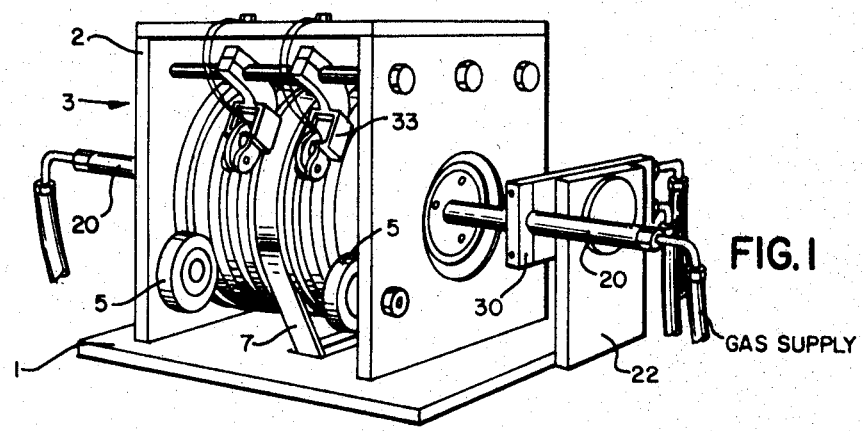
FIG. 1 is a perspective view of a high melt engine made in accordance with the present invention, this engine being shown as it appears when ready for operation.

The construction illustrated conventionally comprises: (A) a base 1: (B) an open-ended box-like housing 2 on the base 1; (C) a high melt engine 3 constructed in accordance with the present invention; (D) means for rotationally supporting the engine 3 within the housing 2, this means including a pair of circular tracks 4 on the periphery of the engine 3, one track adjacent each end of the engine, and a plurality of engine-supporting wheels 5 preferably including three wheels rotationally mounted on each end wall of the housing 2 in position to engage the adjacent track 4 rotationally at more or less equally spaced points; and (E) means for rotating the engine, including a circular "pulley" groove 6 formed on the center portion of the periphery of engine 3 and an endless drive belt 7 extending around the top half of pulley 6 and downwardly into the base 1 where it is suitably connected to a motorized drive pulley not shown.

The engine 3 is conventional to the extent that it comprises: (A) a cylindrical sheet shell 10 having metal end plates 11, each containing a centrally-disposed axial opening; an inner open-ended cylindrical structure 12 dividing the interior of the shell 10 into an inner axial chamber 13 and an outer annular chamber 14, the latter being filled with suitable heat insulating material which is not shown.

INVENTIVE STRUCTURE

In the presently preferred embodiment of my invention, the inner chamber 13 is provided (a) along its axis, with a stationary rod-like cathode having an inner end terminating adjacent the center of the chamber, and (b) concentrically about its axis, with an open-ended cylindrical anode surrounding the inner end portion of cathode and spaced outwardly therefrom and these two electrodes are arranged to be connected across a suitable source of electrical power to establish and maintain an electrical arc therebetween under electrical power conditions sufficient to liquefy the anode while the engine is rotating at a rate sufficient to maintain the liquid anode in the form of a liquid pipe.

While only one cathode 20 is necessary, the embodiment illustrated contains two cathodes 20, one projecting into each end of the inner chamber 13. It is desirable to maintain a gaseous atmosphere within the inner chamber 13 and, where chemical reaction is to be avoided, this atmosphere should be provided by an inert gas such as one of the noble gases. While a gaseous atmosphere may be provided and maintained in any suitable way, in the structure illustrated, it is provided and maintained by making each cathode 20 hollow, directing a flow of helium gas into the interior thereof and discharging that gas from the electrode into the center of the inner chamber 13 where it may reverse its direction of flow and pass outwardly through the ends of the chamber 13. If desired, the inner end of at least one cathode may be closed and its adjacent peripheral wall provided with one or more laterally directed gas discharge openings 21. Each cathode 20 is electrically insulated from both housing 2 and base 1 and is supported on the base through an electrical insulator block 22.

The open-ended cylindrical anode is incorporated in the inner cylindrical structure 12, which is in the form of an open-ended cylindrical composite or pipe 12. While this pipe may be variously constructed, it is illustrated as comprising: an outer sleeve-like support 24 preferably composed of graphite or carbon, dimensioned to extend axially from one end of the engine to the other and formed with a cylindrical bore of uniform diameter; and a composite cylindrical liner snugly fitted within that bore. The liner has an overall length substantially equal to the length of the surrounding cylindrical support 24 but is composed of three sections comprising two end sections 25 flanking a centrally-disposed composite center section 26 which constitutes the anode.

The flanking liner end sections 25 are also preferably composed of graphite or carbon. The center liner section 26 is a composite formed by inner and outer cylinders 26A and 26B. The inner cylinder 26A is composed of the appropriate high melt material and functions as the active anode electrode. The outer cylinder 26B functions as a backing or holder for the active anode 26A and is composed of carbon or graphite. Proceeding from each end of the backing 26B toward its center, the radius of its bore wall increases to provide an annular V-shaped groove in which an anode 26A is fitted, the thickness of the anode increasing in like manner from its ends toward its center. This arrangement tends to pool the molten materials.

The cathodes 20 may be directly connected to one side of a suitable source of electrical DC power in any suitable way. This may conveniently be done through the metal blocks 30 which function to support the cathodes 20 upon adjacent insulator blocks 22. It will be understood that the frictional grip of each metal block 30 on its cathode 20 is such as to provide a good electrical connection of substantial area.

The cylindrical anode 26 is electrically connected to the end plates 11 of the steel shell 10 through the electrically conductive inner cylindrical structure 12 while the periphery of the steel shell 10 provides a pair of circular contact areas or bands, which function as collector rings 32. These rings are normally engaged by electrical brushes carried in brush-holders 33, which are mounted on the housing 2.

OPERATION

Figure 2:
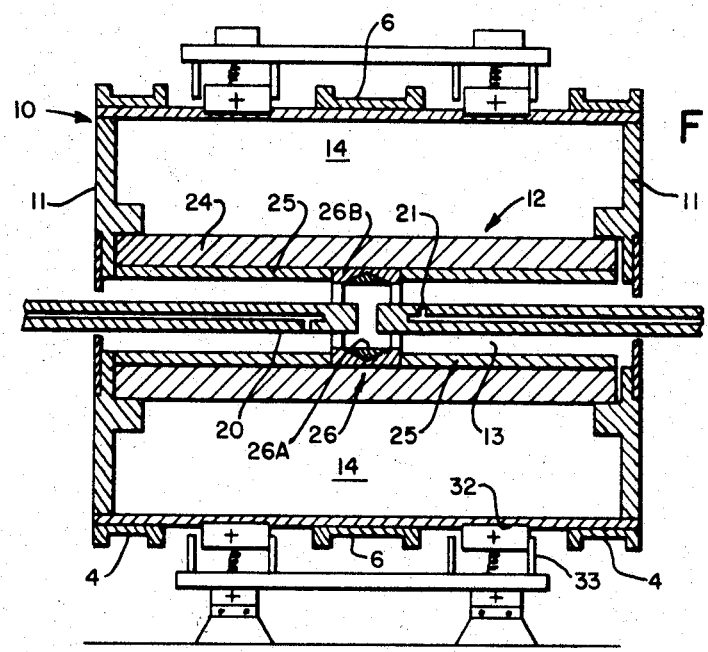
FIG. 2 is a somewhat schematic vertical sectional view of the engine of FIG. 1.
Figure 3:
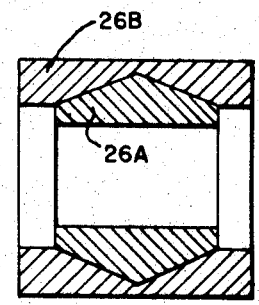
FIG. 3 is an enlarged view of the anode shown in FIG. 2.

I have obtained excellent results with the engine of FIGS. 1–3 using an 8″ steel shell approximately 12″ long, a sleeve-like graphite support 24 having an inside diameter of 1¾″, anodes 26A having inside diameters from .85″ to 1.18″ (2.15 to 3.00 cms.) and graphite cathodes having outside diameters of .50″ to .75″ (1.27 to 1.90 cms.). The motorized drives for this rotary high melt engine has an r.p.m. range of 500 to 1500 r.p.m. Helium gas was fed through each cathode at a rate approximating 2200 cc. per minute. Two separate 300–600 amp., 20 to 40 volt, 16 kw. welding generators were employed as DC power sources, one for each cathode.

Six runs—4 TaC, 2WC.—In 4 runs, the V-shaped groove of the backing 26B was provided with an anode 26A composed of 100 to 135 grams of tantalum carbide powder which had been compacted and sintered in that groove to form the cylindrical anode.

These samples were substantially (60 to 95%) but not completely liquefied; hence temperatures of 4200 ° K. were reached. In two other runs, the anode 26A was composed of 113 and 117 grams of tungsten carbide powder, respectively. These samples were completely liquefied and their temperatures probably raised substantially above the melting point of WC.

The dimensions of each composite anode 26, the weight of the high melt material in it, the run time, average power consumption and the estimated weight percentage of liquefied material are given in Table I which follows:

TABLE I

| Run No. | Approximate cm. dimensions of ring before melting | | | Sample weight, grams | Run time, min. | Average power, kw. | Estimated weight percent liquefied |
| --- | --- | --- | --- | --- | --- | --- | --- |
| | O.D. | I.D. | Length | | | | |
| TaC-5 | 4.4 | 3.0 | 3.2 | 110 | 10 | 28 | 60 |
| TaC-6 | 4.4 | 3.0 | 3.2 | 100 | 4 | 23 | 60 |
| TaC-7 | 4.4 | 3.0 | 3.2 | 100 | 6 | 22 | 70 |
| TaC-8 | 3.9 | 2.15 | 4.5 | 109 | 4 | 32 | 95 |
| WC-2 | 3.9 | 2.15 | 4.5 | 117 | 4 | 23 | 100 |
| WC-3 | 3.9 | 2.15 | 4.5 | 113 | 2.5 | 27 | 100 |

Five runs, 3 NbC, 2 ZrC.

In five other runs, using anode samples ranging from 30 to 85 grams, 3 niobium and 2 zirconium carbide pipes (approximately 4.5 cms. long x 3 cms. inside diameter x 0.5 cm. wall thickness) were melted and thereafter contained in rotating graphite backing cylinders 26B at temperatures between 3800° and 4700° K. for periods between 2 and 10 minutes. The engine speed approximated 550–555 r.p.m. The gas flow approximated 2200 ccs./min. The duration of the runs ranged from 5½ to 15 minutes.

In Run #1, a zirconium carbide sample was held in a rotating graphite pipe at temperatures exceeding 3500° K. for four minutes. The temperature, measured with an optical pyrometer at four minutes before the end of the run, was 3500° K. and it gradually increased to 3800° K.

The sample was 100% liquefied and maintained in pipe form at 555 r.p.m. The operating conditions for each electrode are shown in Table II which follows:

TABLE II

| Time, minutes | Start | 1'45" | 3'0" | 4'0" | 5'0" | 6'30" | 7'30" | 8'45" |
|---|---|---|---|---|---|---|---|---|
| Electrode I: | | | | | | | | |
| Amps | 300 | 200 | 275 | 275 | 350 | 375 | 275 | 200 |
| Volts | 28 | 34 | 28 | 28 | 30 | 30 | 40 | 40 |
| Kw | 8.4 | 6.8 | 7.7 | 7.7 | 10.50 | 11.25 | 11.00 | 8.0 |
| Electrode II: | | | | | | | | |
| Amps | 300 | 100 | 200 | 200 | 300 | 300 | 250 | 200 |
| Volts | 20 | 36 | 28 | 25 | 30 | 34 | 40 | 44 |
| Kw | 6.0 | 3.6 | 5.6 | 5.0 | 9.0 | 10.2 | 10.0 | 8.8 |
| Total Power, kw | 14.4 | 10.4 | 13.3 | 12.7 | 19.5 | 21.4 | 21.0 | 16.8 |

In Run #2, a niobium carbide sample was held in a rotating graphite pipe at temperatures between 3300° and 3900° K. for six minutes in a total run time of eight minutes. Complete melting achieved.

In Run #3, about 30 grams of liquid zirconium carbide was contained in a graphite pipe at temperatures between 3700–4000° K. for 10 minutes. Before making this run, the graphite backing 26B was provided with a 6 mm. wall thickness at its apex as compared to the 2 mm. apex previously used.

In Run #4, a niobium carbide sample was held in a rotating graphite pipe between 4400–4700° K. for a few minutes during a total run time of 5½ minutes.

In Run #5, approximately 77.2 grams of Grade I NbC was contained in a graphite pipe at temperatures between 3800–4100° K. for 3½ minutes in a total run time of 5½ minutes.

FIGS. 4–5

Figures 4, 5:
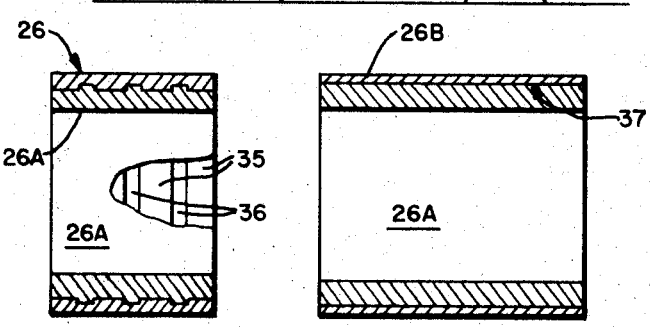
FIGS. 4 and 5 are similar views of modified anode constructions.

The modified composite anode structure 26 shown in FIG. 4 comprises an active high melt anode cylinder 26A formed in a graphite or carbon holder or backing cylinder 26B having a serrated bore wall characterized by several circular ridges 35 forming intervening circular notches 36.

In FIG. 5, the backing cylinder 26B has a bore wall 37 of constant diameter.

Having described my invention, I claim:

1. A novel high melt arrangement for a high melt engine of the rotary molten-liquid-pipe type having an axial inner chamber, comprising:
   (A) a pair of 1st and 2nd electrodes providing an anode and a cathode within said chamber,
      (1) one of said electrodes extending along the axis of said chamber, and
      (2) the other of said electrodes having high melt electrode material extending about the axis thereof and means mounting the other of said electrodes to rotate with the engine; and
   (B) means for connecting said electrodes across a suitable source of electrical power to maintain an electrical arc therebetween.

2. The arrangement of claim 1 wherein:
   (A) said other electrode is in the form of a cylinder extending concentrically about said axis.

3. The arrangement of claim 1 wherein:
   (A) said other electrode is in the form of a graphite cylinder extending concentrically about said axis and having high melt electrode material on its bore wall.

4. The arrangement of claim 1 wherein:
   (A) said one of said electrodes is a rod-like cathode; and
   (B) said other of said electrodes is a cylindrical anode.

5. The arrangement of claim 1 including:
   (A) means for maintaining a relatively inert gaseous atmosphere in said inner chamber.

6. The arrangement of claim 5 wherein:
   (A) said cathode is hollow; and
   (B) said atmosphere maintaining means includes means for flowing a stream of gas through said hollow cathode.

References Cited

UNITED STATES PATENTS

| | | | |
|---|---|---|---|
| 2,863,738 | 12/1958 | Van Antwerp | 13—9 XR |
| 3,147,330 | 9/1964 | Gage | 219—121 XR |
| 3,286,012 | 11/1966 | Foex | 13—1 |
| 3,300,561 | 1/1967 | Foex | 13—3 |
| 2,997,006 | 8/1961 | Grosse | 110—1 |

BERNARD A. GILHEANY, *Primary Examiner.*

H. B. GILSON, *Assistant Examiner.*

U.S. Cl. X.R.

13—18